Aug. 23, 1966 W. A. GUSTAFSON 3,268,022
GROUND EFFECTS VEHICLE
Filed Jan. 29, 1964 3 Sheets-Sheet 1

Inventor
Wayne A. Gustafson
Attorney

Aug. 23, 1966  W. A. GUSTAFSON  3,268,022
GROUND EFFECTS VEHICLE
Filed Jan. 29, 1964  3 Sheets-Sheet 2
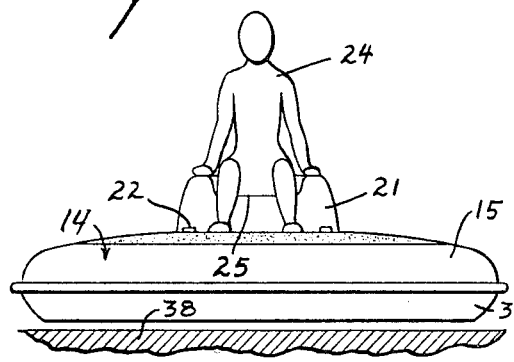
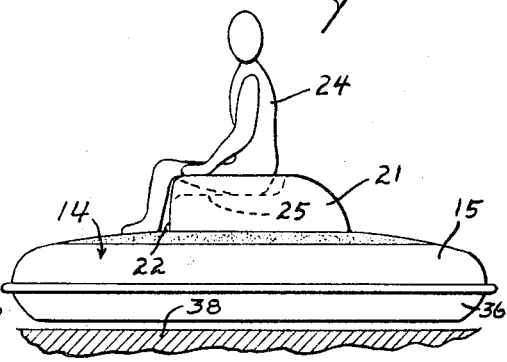
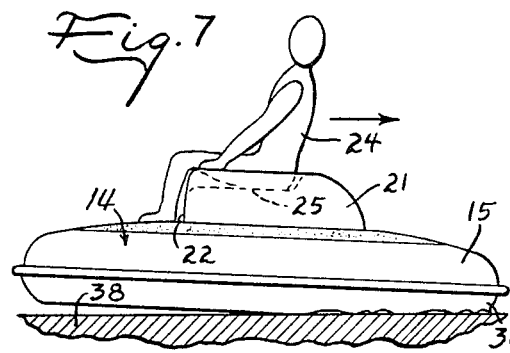
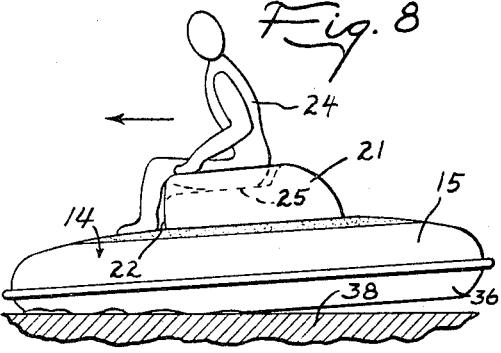
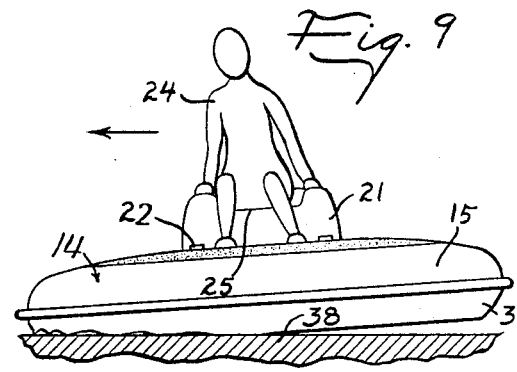
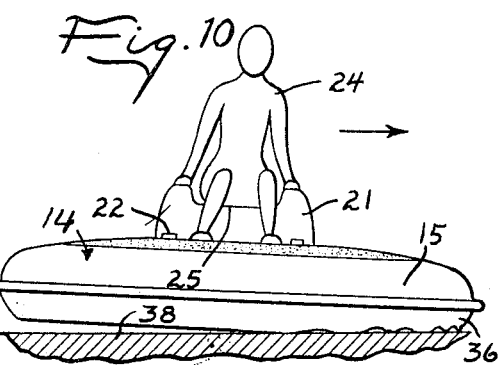
Inventor
Wayne A. Gustafson
Attorney

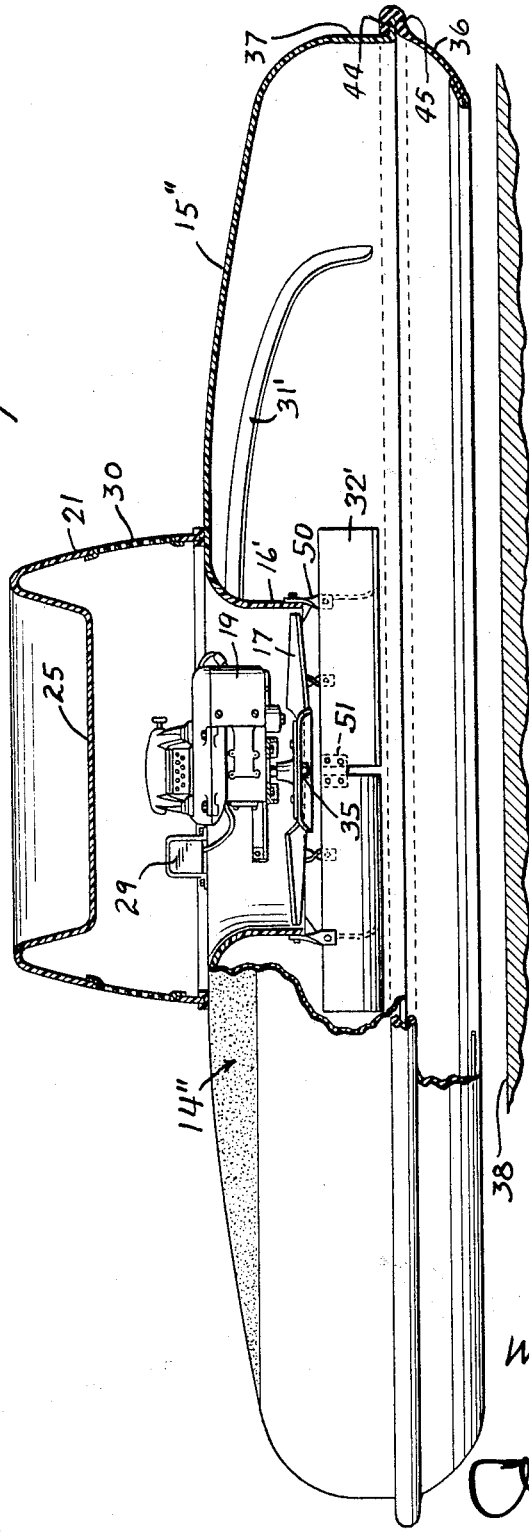
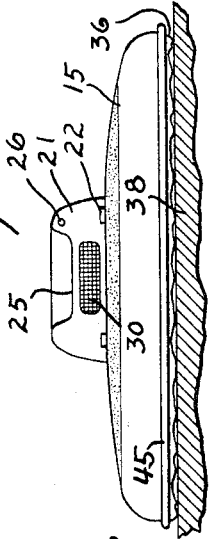
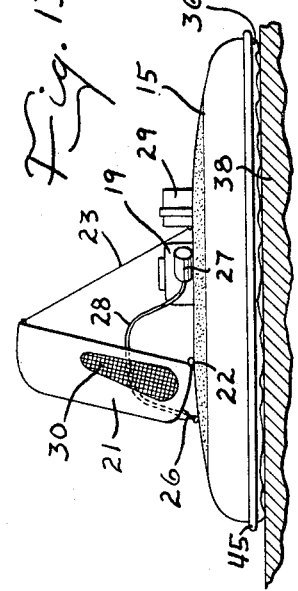

United States Patent Office 3,268,022
Patented August 23, 1966

3,268,022
GROUND EFFECTS VEHICLE
Wayne A. Gustafson, North Hudson, Wis., assignor to John E. Magner, South Beloit, Ill.
Filed Jan. 29, 1964, Ser. No. 341,069
4 Claims. (Cl. 180—7)

This invention relates to a ground effects vehicle which while designed for amusement park use, where it will be called an Air Car or Flying Saucer, or the like, is not limited to that specific use.

The principal object of my invention is to provide a vehicle of the kind mentioned comprising a circular or doughnut shaped shell having a blower fan operating on a vertical axis in the center driven by an air cooled motor mounted above the fan of sufficient power to build up air pressure under the shell to maintain it in floating or hovering relation to the ground while a person who has control of the throttle and is riding on top of the shell at the center thereof steers the vehicle by tilting the shell by inclination of his body in the intended direction of travel, the outrush of air on the high side during such tilting of the shell giving it the impetus or jet propulsion in the direction selected by the rider, thereby reducing the construction of the vehicle substantially to its simplest terms, other ground effects vehicles heretofore devised having required complicated control means associated with a complicated system of vents and closures to obtain a similar result in a far different way, while greatly reducing the amusement factor.

Other features of the present invention also considered important are:

(1) An inwardly curved downwardly projecting air pressure retaining skirt of flexible resilient material depending from the rim of the shell, permitting tilting of any edge portion of the shell as the skirt will yield to whatever extent is necessary upon contact with the ground at that low point while the rest of the skirt still performs its intended function, the thrust in whatever direction is selected by the rider being always in the direction of the low point by virtue of the outrush of the most air at the diametrically opposite high point, the skirt furnishing uniform resilient support peripherally of the shell when the vehicle is at rest, so that there is never any excessive or destructive loading on the skirt and no need for providing supporting caster wheels;

(2) The attaching rim portion on the pressure skirt projects radially outwardly from the rim of the shell and serves as a resilient bumper for protection of the shell against damage in the event of an unskilled rider running the vehicle into a wall or any other obstruction or object;

(3) Torque counteracting vanes are provided radially of the shell extending from the central opening so as to be disposed in the direct path of the air delivered downwardly from the fan, these vanes being curved transversely to set up the required opposing torque in the shell so that it will not tend to turn in the direction opposite the direction of the fan;

(4) Extending radially outwardly from these curved vanes inside of the shell are reenforcing ribs which cooperate with the vanes to pocket and direct the air in a vortex on a horizontal axis in each pie-shaped portion of the shell defined between neighboring ribs and vanes to improve the pressure build-up and consequent lift obtained while at the same time giving the shell the necessary structural strength even though it is preferably molded of fiber glass with fairly thin walls for the desired lightness, and (5) A combination seat and engine hood is hingedly mounted on top of the shell and is swingable to an out-of-the-way position to afford easy access to the engine and fuel tank, and this hood carries an oscillatable throttle control lever connected with the carburetor of the engine through a flexible spring wire encased in a flexible cable, the lever being conveniently mounted on the hood on one side of the seat defined by a depression in the top of the hood, and the hood having screened openings on the sides and front thereof to admit air drawn in by the fan in the operation of the vehicle.

The invention is illustrated in the accompanying drawings in which:

FIGS. 5 and 6 are a front view and side view of a vehicle made in accordance with FIG. 1 illustrating diagrammatically the position of a seated rider in a motionless or immobile hovering position of the vehicle;

FIGS. 7 and 8 are side views similar to FIG. 6 but showing how the rider by inclining his body to the rear or forwardly can obtain rearward travel or forward travel by reason of the inclination of the shell, as indicated by the arrows;

FIGS. 9 and 10 are front views similar to FIG. 5 but illustrating how sidewise travel to the left or right is obtainable by inclination of the body;

FIG. 11 is a view partly in front elevation and partly in vertical section of another ground effects vehicle similar to that of FIG. 1 but showing a modified or alternative vane structure and radially reinforcing ribs;

FIG. 12 is a front view of the vehicle of FIG. 1 shown at rest on the ground, and FIG. 13 is a side view of FIG. 12 showing the combination engine hood and seat swung to an out-of-the-way position.

Similar reference numerals are applied to corresponding parts throughout the views.

Figure 1:
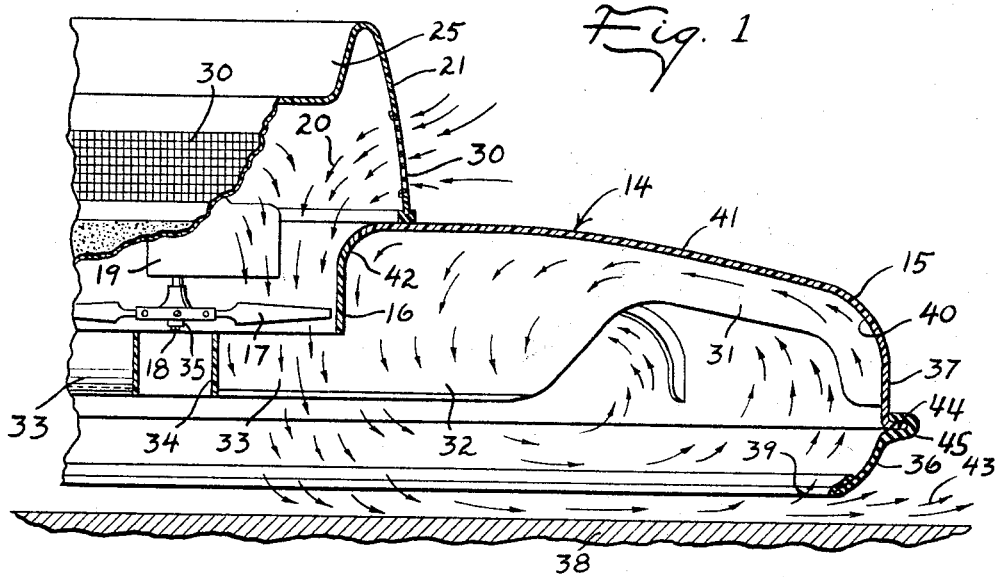
FIG. 1 is a vertical section through a ground effects vehicle made in accordance with my invention and illustrating the preferred arrangement of torque counteracting vanes, this section being taken on the broken line 1—1 of FIG. 2.
Figures 2, 3:
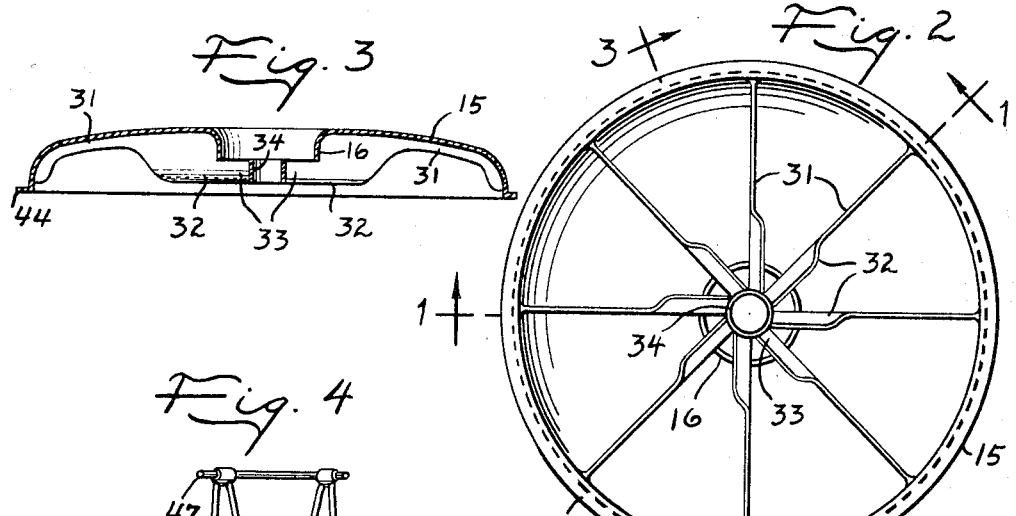
FIG. 2 is a bottom view of the shell shown in FIG. 1, on a reduced scale with the pressure skirt removed.
FIG. 3 is a cross-section on the line 3—3 of FIG. 2.

Referring first to FIGS. 1 to 3, the reference numeral 14 designates the preferred form of ground effects vehicle made in accordance with my invention, the same comprising a circular or doughnut shaped hollow fiber glass shell 15 having a central downwardly projecting neck portion 16 within which the highly efficient fan 17 necessary for the building up of air pressure inside the shell 15 operates on a vertical axis as indicated at 18, an air cooled engine 19 for driving the fan being suitably mounted on the shell directly over the fan and partially enclosed within the neck 16 so as to be cooled by the inrush of air indicated by the arrows 20. A combination seat and engine hood is shown at 21 and is suitably hinged to the top of the shell 15 at one end as indicated at 22 in FIG. 13 so as to be swingable forwardly and upwardly to an out-of-the-way position, such movement being limited suitably by a flexible cable or chain indicated at 23 in FIG. 13 fastened at one end to the shell and at the other end to the hood. The rider indicated at 24 in FIGS. 5 to 10 sits in the seat defined by the depression 25 in the hood 21 and manipulates a throttle control lever 26 that is connected with the carburetor 27 of the engine by means of a flexible spring wire slidable inside a flexible cable 28 illustrated in FIG. 13, the throttle control lever 26 being conveniently accessible for the rider 24 at one side of the seat 25. Also housed inside the hood 21 is the fuel tank 29 to which access must of course be had from time to time to replenish the fuel supply. Screened air intake openings are provided on both sides and across the front end of the hood 21 as indicated at 30.

A plurality of radially arranged reenforcing ribs 31 is provided on the inside of the shell 15 molded of fiber glass integral with the shell. These ribs are molded integral with the outer ends of transversely curved radial vanes 32, the radially inner end portions 33 of which are disposed in the direct path of the air delivered downwardly by the fan 17, so that a counteracting torque is set up in the shell 15 neutralizing the tendency for the shell to turn in the opposite direction to the fan 17. Thus, assuming the fan 17 turns in a clockwise direct as viewed from above, the shell 15 would have a tendency to turn in a counter clockwise direction were it not for the fact that the transverse curvature of the vanes 32 is such that they set up a counteracting torque in a clockwise direction sufficient to neutralize that tendency. The vanes 32 have their radially inner end portions 33 molded integral with a neck 34 concentric with but below the neck 16. The neck 34 affords easy access to the nut 35 fastening the fans 17 to the driveshaft 18.

A flexible resilient inwardly curved pressure skirt 36 is attached to and depends from the downwardly curved rim portion 37 of the shell 15 and serves several functions:

(1) It forms a seal between the ground 38 and the shell 15 at the outset when the vehicle is at rest as in FIGS. 12 and 13, besides providing a resilient cushion support peripherally of the shell with the weight uniformly distributed on the skirt at all points;

(2) It scoops some of the air flowing radially outwardly along the ground and directs it upwardly towards the top of the shell as indicated at 39 in FIG. 1, curvature of the shell at 40 serving to direct the air radially inwardly between the ribs 31 along the underside of the top wall 41 of the shell, the air finally being directed downwardly again by the curvature at 42 at the upper end of the neck 16, to complete a vortex on a substantially horizontal axis, a certain percentage of the air escaping below the skirt 36 as indicated at 43 in FIG. 1, and this escape being substantially uniform peripherally of the shell 15 in a stationary hovering condition illustrated in FIGS. 5 and 6, with the skirt disposed an inch or two from the ground 38, depending of course on the speed at which the engine 19 is operated and the pressure accordingly built up under the shell 15 giving the lift;

(3) It allows the rider 24 to tilt the shell 15 as illustrated in FIGS. 7 to 10 to shut off the escape of air on the low side and increase the escape of air on the diametrically opposite high side and thereby propel the vehicle in any selected direction by jet propulsion, the direction of travel being indicated by arrows in FIGS. 7 to 10, and (4) When the skirt is applied over an outwardly projecting annular flange 44 provided on the lower edge of the shell 15, the bifurcated rim portion 45 provided on the upper edge of the skirt, which is suitably of increased thickness in relation to the rest of the skirt, serves as a resilient bumper to engage walls and obstructions or objects of any kind in the path of the vehicle to absorb the shock of collision and avoid damage to the shell, the rim 45 being applied first to the one-half of the circumference of the flange 44 and requiring a certain amount of stretching to apply the same to the rest of the flange, so that it snaps into place finally and there is therefore no danger of the skirt 36 coming off, and yet is is a fairly simple matter to remove the skirt when it becomes wornout sufficiently to require replacement.

Figure 4:
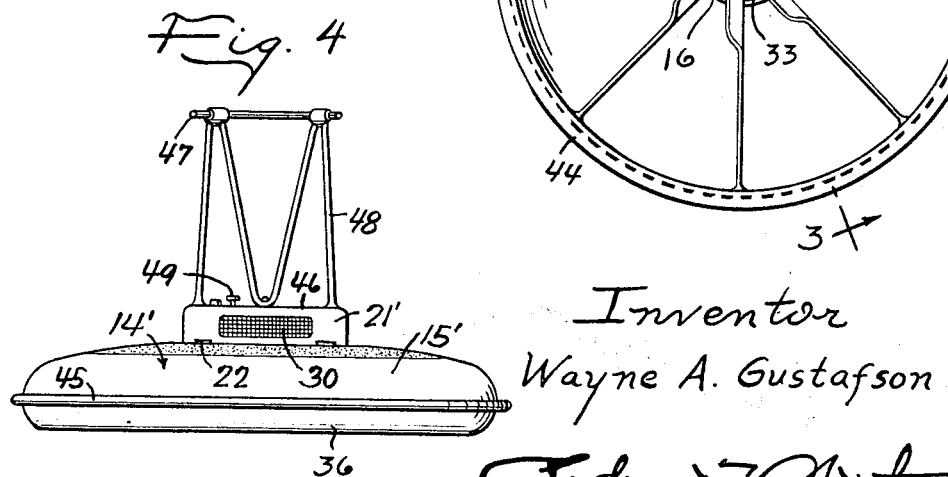
FIG. 4 is a side view of another ground effects vehicle shown on the same scale as FIGS. 2 and 3 having an upright enclosure or stand provided on the top thereof for a standing rider, in lieu of the seat shown in FIG. 1.

The hood 21' shown in the modified form 14' illustrated in FIG. 4 is hinged at one end to the top of the shell 15' similarly as the hood 21 and is adapted to be raised and swung out of the way and supported in that position similarly as the hood 21 is shown in FIG. 13, but the hood 21' is much lower and has a flat top surface 46 adapted to serve as a platform for a standing rider who will take hold of the semi-circular or generally U-shaped railing 47 provided on top of the frame 48 at approximately waist level, whereby to steer the vehicle in any desired direction by inclining the shell 15' with the frame 48 similarly as in FIGS. 5 to 10, the only difference being that the rider is standing instead of being seated. Throttle control of the engine 19 in this case is by means of a depressible foot pedal 49 operatively connected with the carburetor 27 by means of a spring wire inside a flexible cable 28 similarly as shown in FIG. 13. A throttle lever like that shown at 26 in FIGS. 12 and 13 could be provided on top of the frame 48 for hand control. The operation of vehicle 14' is otherwise substantially the same as vehicle 14.

In lieu of the vanes 32 molded integral with the radial reinforcing ribs 31, I may, as shown in the modified form 14" illustrated in FIG. 11, have the radial reinforcing ribs 31' molded integral with the shell 15" extending from the upper portion of the neck 16' out to the rim 37, and provide separate elongated transversely curved blades 32' disposed radially with respect to and rigidly suspended from the lower end of the neck 16' as indicated at 50, diametrically opposed and oppositely curved blades having their inner ends rigidly connected as indicated at 51. Eight such blades are provided spaced at 45° with respect to one another. The operation of this vehicle is substantially the same as the others.

It is believed the foregoing description conveys a good understanding of the objects and advantages of my invention. The appended claims have been drawn to cover all legitimate modifications and adaptations.

I claim:

1. A ground effects vehicle comprising an inverted substantially circular dished shell of rigid material providing a downwardly curved outer rim and having a substantially central opening of substantially circular form provided therein defined by a downwardly projecting neck on said shell, a rotary fan disposed on a substantially vertical axis in the neck driven by an engine mounted on the shell above the fan and adapted to discharge air downwardly so as to build up air pressure under said shell for both lift and propulsion purposes, a passenger support carried on top of the central portion of said shell over the engine with engine control means operable by the passenger to speed up or slow down the engine speed, said support allowing free inlet of air to the fan between said support and shell, an annular skirt of flexible resilient material depending from the downwardly curved rim portion of said shell and curved inwardly to scoop up air flowing outwardly from the fan along the ground under said shell and direct it upwardly toward the underside of the shell so as to create vortex air currents under said shell on substantially horizontal axes, said skirt permitting substantially uniform air discharge in all directions under all portions of its lower edge with the vehicle hovering motionless, but said skirt serving to shut off discharge at any selected portion of its lower edge by tilting of the shell by the passenger, whereby the vehicle is propelled in the direction of the lowermost edge portion of said skirt by the air discharged at the diametrically opposite highermost edge portion of said skirt, vanes in rigid relationship to said shell extending substantially radially of said shell under the neck portion in the path of the air discharged downwardly from said fan, said vanes deflecting the air so as to set up in said shell a counteracting torque in a direction tending to neutralize the shell's torque reaction from the fan, and reinforcing ribs on the underside of said shell radially aligned with said vanes and projecting downwardly sufficiently to define pie-shaped air pockets in which to localize vortex air currents under the shell.

2. A ground effects vehicle as set forth in claim 1 wherein said ribs are integral with said shell and with said vanes.

3. A ground effects vehicle as set forth in claim 1 wherein said vanes terminate at their radially inner ends at a circular neck of small radius in relation to the fan concentric with but below the neck on said shell.

4. A ground effects vehicle as set forth in claim 1 wherein said ribs are integral with said shell and with said vanes, and said vanes have their radially inner ends integral with a circular neck of small radius in relation to the fan concentric with but below the neck on said shell.

References Cited by the Examiner
UNITED STATES PATENTS

| | | | |
|---|---|---|---|
| 2,011,525 | 8/1935 | Parsley | 285—240 X |
| 2,889,847 | 6/1959 | Schober | 285—260 X |
| 2,953,321 | 9/1960 | Robertson et al. | 180—7 |
| 3,110,996 | 11/1963 | Dahlman | 180—7 X |
| 3,170,285 | 2/1965 | Ferri | 244—23 X |
| 3,182,740 | 5/1965 | Cockerell | 180—7 |
| 3,195,665 | 7/1965 | Beardsley | 180—7 |

OTHER REFERENCES

The New York Times, "Princeton Develops Scooter," p. M31 October 1, 1959, Art. and Photo.

The Washington Post, "Area Firm Scores Air Cush. First," p. C10, July 31, 1960.

BENJAMIN HERSH, *Primary Examiner.*

M. S. SALES, *Assistant Examiner.*